(12) United States Patent
Schramm et al.

(10) Patent No.: US 7,479,228 B2
(45) Date of Patent: Jan. 20, 2009

(54) METHOD AND DEVICE FOR CHROMATOGRAPHIC COMPONENT SEPARATION

(75) Inventors: Henning Schramm, Magdeburg (DE); Achim Kienle, Magdeburg (DE); Malte Kaspereit, Wengelsdorf (DE); Andreas Seidel-Morgenstern, Magdeburg (DE)

(73) Assignee: Max-Planck-Gesellschaft zur Forderung der Wissenschaften E.V. (DE)

( * ) Notice: Subject to any disclaimer, the term of this patent is extended or adjusted under 35 U.S.C. 154(b) by 138 days.

(21) Appl. No.: 10/523,092

(22) PCT Filed: Jul. 29, 2003

(86) PCT No.: PCT/EP03/08347

§ 371 (c)(1),
(2), (4) Date: Apr. 4, 2005

(87) PCT Pub. No.: WO2004/014511

PCT Pub. Date: Feb. 19, 2004

(65) Prior Publication Data

US 2005/0167365 A1 Aug. 4, 2005

(30) Foreign Application Priority Data

Aug. 2, 2002 (DE) ................ 102 35 385

(51) Int. Cl.
*B01D 15/08* (2006.01)
(52) U.S. Cl. ..................... 210/659; 210/198.2
(58) Field of Classification Search ............. 210/659, 210/635, 656, 662, 672, 198.2
See application file for complete search history.

(56) References Cited

U.S. PATENT DOCUMENTS 2,985,589 A 5/1961 Broughton et al. ........... 210/34

(Continued)

FOREIGN PATENT DOCUMENTS

DE 198 42 550 A1 3/2000

(Continued)

OTHER PUBLICATIONS

Biressi G. et al: "Experimental investigation of the behavior of gas phase Simulated moving bed."—Journal of Chromatography A. Elsevier Science, NL, vol. 957, No. 2, 223-225, May 31, 2002.

(Continued)

*Primary Examiner*—Ernest G Therkorn
(74) *Attorney, Agent, or Firm*—Ballard Spahr Andrews & Ingersoll, LLP

(57) ABSTRACT

The invention relates to a process for the chromatographic separation of components (19, 20, 25, 26, 28, 29) of a multiple-component fluid mixture (2a) by means of the Simulated Moving Bed process, in which the multiple-component fluid mixture (2a) and at least one solvent (3a) are passed into a plurality of at least one chamber (10a-10c; 11a-11c; 12a-12c; 13a-13c) or chamber sections containing a solid, at a first and second input (9b, 9d; 9f, 9h), and an extract flow (6a), which contains at least one first component (19, 26, 29) separated from the multiple-component fluid mixture (2a), as well as a raffinate flow (7a), which contains at least one second component (20, 25, 28) separated from the multiple-component fluid mixture (2a) are drawn off from the chambers (10a-10c; 11a-11 c; 12a-12c; 13a-13c) or chamber sections at a first and second outlet (9a, 9c; 9e, 9g), whereby the chambers (10a-10c; 11a-11c; 12a-12c; 13a-13c) or chamber sections forming a closed circuit (8a, 8b; 18) are connected together in series, whereby the concentration of the input multiple-component fluid mixture (2a) and/or a composition of the solvent (3a) is/are changed within the cycle unit.

14 Claims, 6 Drawing Sheets

U.S. PATENT DOCUMENTS

| | | | |
|---|---|---|---|
| 4,031,155 A * | 6/1977 | Healy et al. | 585/828 |
| 4,031,156 A * | 6/1977 | Geissler et al. | 585/825 |
| 4,293,346 A | 10/1981 | Landis et al. | 127/46 |
| 4,412,866 A * | 11/1983 | Schoenrock et al. | 127/46.2 |
| 5,102,553 A | 4/1992 | Kearney et al. | 210/659 |
| 5,122,275 A | 6/1992 | Rasche | 210/659 |
| 5,156,736 A * | 10/1992 | Schoenrock | 210/264 |
| 5,422,007 A | 6/1995 | Nicoud et al. | 210/659 |
| 5,618,972 A | 4/1997 | Funk et al. | 560/239 |
| 5,719,302 A * | 2/1998 | Perrut et al. | 554/191 |
| 5,762,806 A | 6/1998 | Hotier | 210/659 |
| 5,770,088 A | 6/1998 | Ujeda et al. | 210/659 |
| 6,136,198 A * | 10/2000 | Adam et al. | 210/659 |
| 6,398,962 B1 * | 6/2002 | Cabrera et al. | 210/635 |
| 6,413,419 B1 * | 7/2002 | Adam et al. | 210/198.2 |
| 6,677,469 B1 * | 1/2004 | Dunford et al. | 554/205 |
| 7,072,742 B1 * | 7/2006 | Bellafiore et al. | 700/265 |
| 2004/0220439 A1 * | 11/2004 | Williams et al. | 585/477 |

FOREIGN PATENT DOCUMENTS

| | | | |
|---|---|---|---|
| EP | 0577079 A1 | | 1/1994 |
| WO | WO 00/25885 | | 5/2000 |
| WO | WO 00/33934 | * | 6/2000 |

OTHER PUBLICATIONS

Mazzotti M., et al. "Optimal operation of simulated moving bed units for nonlinear chromatographic separations."—Journal of Chromatography A. Elsevier Science, NL., vol. 769, No. 1, 3-24, May 2, 1997.

Ludemann-Hombourger, O., et al. The "VARICOL" Process: A New Multicolumn Continuous Chromatographic Process—Separation Science and Technology, 35(12): 1829-1862 (2000).

* cited by examiner

METHOD AND DEVICE FOR CHROMATOGRAPHIC COMPONENT SEPARATION

CROSS REFERENCE TO RELATED APPLICATION

The present application claims priority to German Patent Application No. 102 35 385.9, filed Aug. 2, 2002 which application is incorporated herein fully by this reference.

REFERENCE TO RELATED APPLICATIONS

This application is a 371 of PCT/EP03/125576 filed Jul. 29, 2003.

The invention relates to a process and an apparatus for the chromatographic separation of components of a multiple-component fluid mixture by means of the Simulated Moving Bed process in accordance with the preambles of claims 1 and 14.

Such processes are used, in the pharmaceutical and chemical industries in particular, to separate components of a mixture of substances to a high grade of purity, even where the mixture of substances involves a complex multiple-component fluid mixture, the components of which may, in addition, display temperature sensitivity. Use is thereby made of the differing affinities of the components which are to be separated towards a solid (preferably adsorbent material) in order to separate them.

Conventionally, chromatographic separations are carried out using a batch process. In such a batch process, a solvent (eluent) is passed through a chamber filled with the solid (separating column). A limited quantity of the multiple-component fluid mixture is injected into this solvent flow and passes through the separating column. Due to the differing degrees of affinity of the components which are to be separated for the solid, a more or less pronounced interaction with the solid occurs. Accordingly, the components which are to be separated migrate through the separating column at different migration rates and leave the separating column at different times. In order to achieve the desired separation of the components which are to be separated, the multiple-component fluid mixture must be added to the separating column at periodic intervals, which leads to a discontinuous mode of operation of an apparatus as used in the batch process.

In order to achieve a continuous mode of operation, a countercurrent is created between the liquid phase containing the solvent and the solid phase. To achieve this, the solid phase is moved contrary to the direction of flow of the solvent flow.

In the continuous mode of operation, the multiple-component fluid mixture can be continuously introduced in the middle of the separating column, whereby—given a suitable choice of flow relationships between the solid and the liquid phase—more readily adsorbed components move with the solid in the direction of an extract flow which is passed out of the separating column and more poorly adsorbed components move with the solvent flow in the direction of a raffinate flow which is passed out of the separating column.

In order to increase productivity, the separating processes can be operated, in continuous operation, according to the True Moving Bed (TMB) process. Such TMB processes are used on apparatuses which are, as a rule, composed of four separating zones, which consist of at least one chamber or one chamber section, forming a circuit. A true countercurrent between the solid and fluid phase occurs in each separating zone. Two inlets for the multiple-component fluid mixture and the solvent and two outlets for the extract flow and the raffinate flow are arranged between the separating zones. For the most part, the separation of the components takes place in two of the four zones, whereas the other two zones serve the purpose of regeneration of the moving solid and the solvent.

In the known Simulated Moving Bed (SMB) process, problems which arise in connection with the movement and the regeneration of the solid arranged in the individual chambers according to the TMB process are avoided. To this end, a plurality of chambers or chamber sections, each containing a stationary solid, are connected together in series to form a circuit. The movement of the solid is simulated through the cyclical shifting (repositioning) of connection ports of the inlets and outlets by one chamber or one chamber section in the direction of the circuit. The time interval between two such successive repositioning operations (switching operations) is referred to as a cycle unit.

U.S. Pat. No. 2,985,589 describes such an SMB process for continuous chromatographic separation of multiple-component fluid mixtures with a solid adsorbent bed containing the solid and repositionable inlets and outlets.

U.S. Pat. No. 4,293,346 describes the separation of saccharides from an aqueous solution with ion exchange resins by means of the SMB process. In this case the SMB process is used with a reflux zone for effecting a decompression of the ion exchange resin.

The SMB processes described in U.S. Pat. No. 2,985,589 and U.S. Pat. No. 4,293,346 are operated with constant operating parameters such as the input and output volume flows, the duration of a cycle unit and the concentrations of the input multiple-component fluid mixture and the solvent.

In order to optimise the productivity of the equipment using the SMB process, U.S. Pat. No. 5,122,275 and U.S. Pat. No. 5,102,553 suggest changing the input and/or output volume flows during each cycle unit.

U.S. Pat. No. 5,122,275 relates to the division of each cycle unit into an active and a passive period, whereby input and output volume flows are only fed in or passed out during the first, active period. In this way, a more optimal exploitation of the productivity of the apparatus using the SMB process is achieved.

U.S. Pat. No. 5,102,553 describes an SMB process in which the input and output volume flows of the multiple-component fluid mixture, the solvent, the extract flow, the raffinate flow and the internal circulation flow within the circuit are adjusted over time within a cycle unit. An SMB process with such periodically adjustable volume flows allows an increase in productivity to be achieved in comparison with SMB process with constant operating parameters.

Alternatively to the alteration of volume flows within a cycle unit, an asynchronous switching over of the inlets and outlets is suggested in O. Ludemann-Hombourger, R. M. Nicoud and M. Bailly. The "VARICOL" Process: A New Multicolumn Continuous Chromatographic Process. *Separation Science and Technology*, 35(12): 1829-1862, 2000. In the SMB process suggested therein, in contrast to the conventional SMB process, the connection ports of the inlets and outlets are switched over or repositioned at different times, resulting in variable separation zone lengths per time unit. In this way, an increase in the productivity of the apparatus using the SMB process is achieved. Such an SMB process is known as the VARICOL process.

Alternatively, in order to increase the productivity of the apparatus using the SMB process, it is suggested in U.S. Pat. No. 5,422,007 that different pressure values and/or temperature values be applied in the individual separating zones of the apparatus in order to change the adsorptive capacity of the solvent.

The described SMB processes with varying volume flows, asynchronous switching operations and solvent gradients allow an increase in throughput (productivity) of the apparatus using the SMB process. Such apparatuses have a relatively complex structure and involve high manufacturing and/or operating costs. A disadvantage of the process with varying volume flows is the increased strain on the necessary delivery pump assemblies and the associated high susceptibility to failure. A disadvantage of the asynchronous switching strategies is the necessity for the implementation of complex switching algorithms. The design of a process with solvent gradients requires knowledge of thermodynamic data which are not readily accessible.

Accordingly, the present invention is based on the problem of making available a process for the chromatographic separation of components of a multiple-component fluid mixture by means of the Simulated Moving Bed process which avoids the aforementioned disadvantages and which allows an increase in the productivity of an apparatus using the SMB process and a reduction in operating costs, as a supplement or an alternative to the conventional process. It is also the aim of the invention to provide an apparatus for performing this process.

According to the invention, the problem is solved by means of a process with the characteristics of claim 1 of the patent and an apparatus with the characteristics of claim 14 of the patent.

An important aspect of the invention is that, according to the invention, in a process for the chromatographic separation of components of a multiple-component fluid mixture by means of the Simulated Moving Bed process, the concentration of the input multiple-component fluid mixture and/or the solvent is changed within a cycle unit, which represents the duration between two switching operations for repositioning connection ports.

For example, an increase in productivity, defined as the mass of the purified multiple-component fluid mixture per time unit and the solid, of 33% can be achieved, advantageously, through an increased throughput of the multiple-component fluid mixture (feed throughput), achieved through a variation of the concentration of, in particular, the multiple-component fluid mixture, such as can be realised, for example, by feeding the multiple-component fluid mixture at five times the concentration during the fourth quarter of a cycle unit.

Furthermore, a reduction of the specific solvent consumption, which corresponds to the quantity of solvent consumed per produced product mass of a component, of, for example, 21% is achieved.

The concentrations of the products, which correspond to the separated components, are, for example, 25-39% above the concentrations of the separated components achieved using the conventional SMB process.

In order to perform the SMB process, the multiple-component fluid mixture and at least one solvent are passed into a plurality of chambers or chamber sections containing at least one solid, perferably adsorbent material at a first and second input, and an extract flow, which contains at least one first component separated from the multiple-component fluid mixture, and a raffinate flow, which contains at least one second component separated from the multiple-component fluid mixture, passes out of the chambers or chamber sections at a first and second outlet.

The chambers or chamber sections are connected together in series to form a closed circuit, and the connection ports of the first and second inlets and outlets arranged in each case between two chambers or chamber sections of the circuit are, at the end of a cyclical time unit, repositioned between two further chambers or chamber sections of the circuit.

According to a preferred embodiment, two chambers (separating columns) are arranged between two connection ports of the inlets and outlets, between which, at the end of a cycle unit, the connection ports of the inlets and outlets are shifted or repositioned. The connection port is thereby shifted in the direction of the circuit, which is defined by the direction of flow of the fluid flow present within the interconnected chambers.

In order to optimise the regeneration of the solid which is arranged in the chambers, the duration of the cycle unit should preferably lie within a range of 1-10 minutes, for example 3.17 minutes. This makes it possible for the fluid flow to move within the circuit with a volume flow of, preferably, 60 ml/min. In addition, the duration of the cycle unit is sufficiently long to make possible a regeneration of the solid and of the solvent.

The multiple-component fluid mixture, the solvent, the extract flow and the raffinate flow are preferably fed in and drawn off in such a way that a maximum fluid volume flow of 60 ml/min is achieved in the chambers or chamber sections—due to a maximum permitted pressure loss within the apparatus—whereby, because of the functional accuracy of a pump used to deliver the feed flows, the multiple-component fluid mixture is fed in with a volume flow of at least 5 ml/min. In this way, using a concentration of the multiple-component fluid mixture which changes within a cycle unit, the SMB process can be optimally adjusted in terms of the achieved throughput of components which are to be separated and in terms of the specific solvent consumption.

Each cycle unit is, for example, divided into four cycle sections of equal length. In the first three cycle sections, pure solvent is fed to the connection port of the input for the multiple-component fluid mixture, whereas in the last cycle section of the cycle unit a quadruple concentration of, for example, 5 vol % of the multiple-component fluid mixture is fed in, in contrast to the conventional process using constant concentrations of, for example, 1.25 vol % throughout a cycle unit. This means that the same quantity of the multiple-component fluid mixture is processed with the same volume flow.

Because of the changing concentrations of the feed flows during a cycle unit, an increase in the product purity is achieved in comparison with the conventional SMB process with constant volume flows over time.

In a further step, the invented process is optimised in terms of productivity and solvent consumption while complying with stipulated product specifications, such as a required purity of 98%. To this end, the volume flows are optimally adjusted, on the one hand, and the concentrations of the input volume flows in the fourth cycle section are also increased. In this way, a significant increase in productivity, a clear reduction in the specific solvent consumption and an increase in product concentration are achieved in comparison with the conventional process.

The first and second separated components each display a productivity of, preferably, $7.6 \cdot 10^{-4}$ ml/min cm$^3$, which exceeds the productivity achieved using the conventional SMB process by 33%.

The specific consumption of the solvent used for separating the first and second components is 320 ml/ml in comparison with the consumption of approx. 400 ml/ml necessary using the conventional SMB process.

The present invention can be used as a new mode of operation for any conventional apparatus using the SMB process, because simple valve switches or conventional gradient mixing devices which automatically effect the desired modulation of the concentration of the multiple-component fluid mixture can be used to achieve a multiple-component fluid mixture gradient. In contrast, complicated valve control algorithms are necessary with asynchronous switching devices as used according to the VARICOL process. Moreover, in contrast to processes involving varying volume flows, the pumps used in the apparatus are not subjected to alternating loads during operation. This means the pumps are less susceptible to breakdowns.

Further advantageous embodiments are described in the sub-claims.

BRIEF DESCRIPTION OF THE DRAWINGS

Advantages and practical characteristics are described in the following description, in conjunction with the drawings, in which.

DESCRIPTION OF THE PREFERRED EMBODIMENTS

Figure 1:
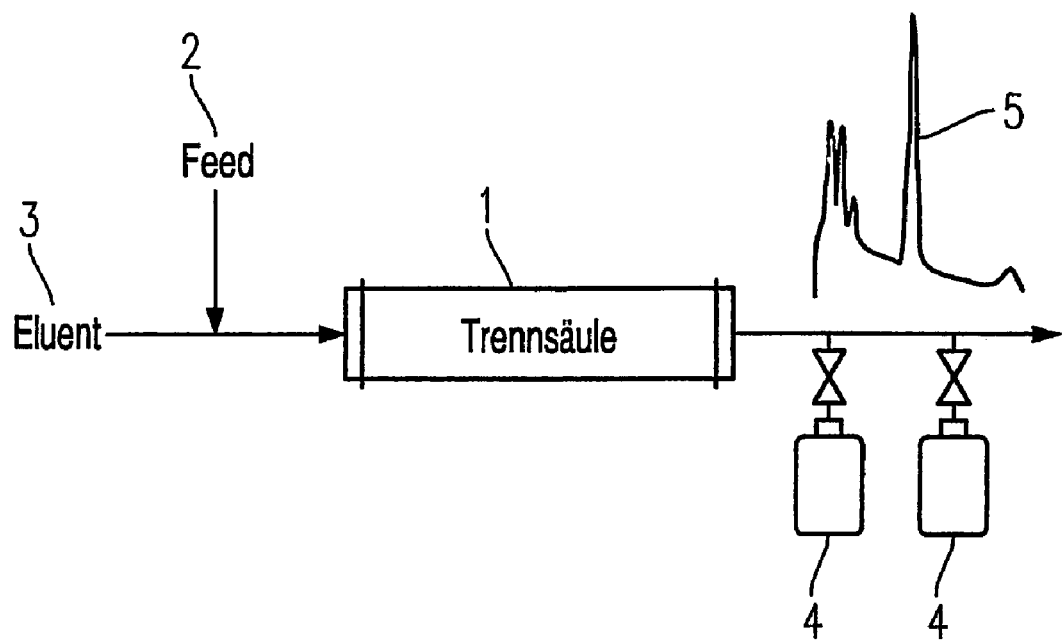
FIG. 1 shows a schematic representation of an apparatus for performing a process for the chromatographic separation of components according to the batch process known from the prior art.

FIG. 1 shows a schematic representation of an apparatus (system) suitable for performing a batch process. In this case, a multiple-component fluid mixture (feed) 2, into which a limited quantity of a solvent (eluent) 3 is injected from time to time, is fed into a separating column 1 which is filled with a solid. The components which are to be separated, which are contained within the multiple-component fluid mixture 2, move with the solvent flow through the separating column 1 and interact with the solid with differing intensity due to the differing affinities which they display towards the solid. This results in differing migration rates of the components which are to be separated, as a result of which the components leave the column separately and are collected separately in containers 4 provided for this purpose. A concentration profile 5 for the first and second component, representative for the batch process, is indicated in FIG. 1.

Figure 2:
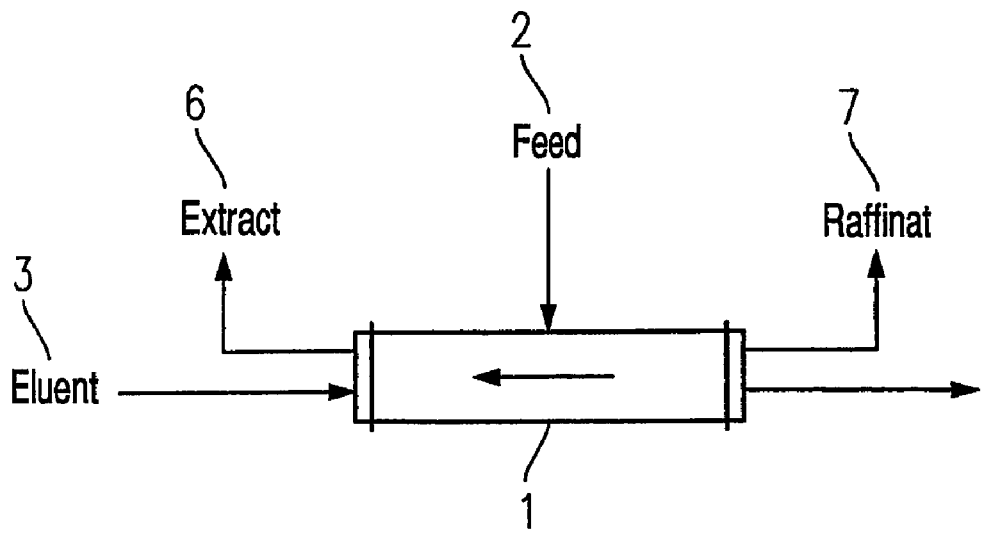
FIG. 2 shows a schematic representation of an apparatus used to perform a process for the chromatographic separation of components according to the continuous chromatographic process known from the prior art.

FIG. 2 shows a greatly simplified schematic view of an apparatus suitable for a continuous chromatographic separation process, which again consists of a separating column 1, a fed multiple-component fluid mixture 2 and a fed solvent 3. In order to allow continuous operation of the system (apparatus), a mobile phase consisting of a multiple-component fluid mixture and solvent and the solid phase (preferably adsorbent material) are moved countercurrently.

The multiple-component fluid mixture 2 is continuously introduced into the the middle of the separating column 1. Given suitable adjustment of the solid and solvent flows, more readily adsorbed components move with the solid phase in the direction of a drawn-off extract flow 6 and less readily adsorbed components move with the eluent flow 3 in the direction of a drawn-off raffinate flow 7.

Figure 3:
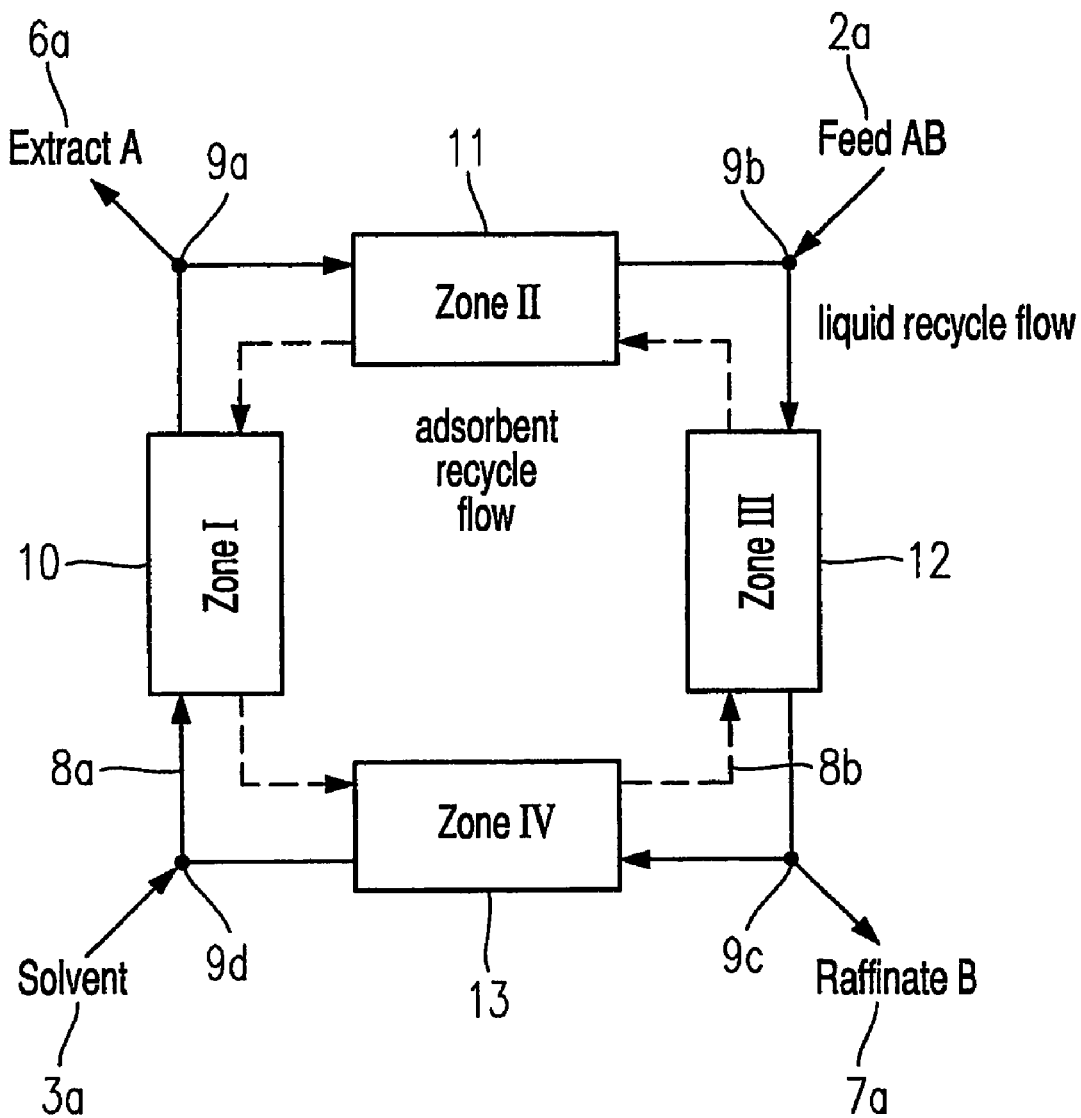
FIG. 3 shows a schematic representation of an apparatus suitable for performing a process for the chromatographic separation of components according to the TMB process known from the prior art.

In order to achieve an increase in the throughput of the components passing through the separating columns by means of a circuit, according to the prior art, using the TMB process, four connected separating zones 10, 11, 12 and 13 are connected together in series (FIG. 3). Connection ports for inlets 9b and 9d for the introduction of the multiple-component fluid mixture 2a and the solvent 3a are arranged between the separating zones 10, 11, 12 and 13. Two outlets 9a and 9c for draining off the extract flow 6a and the raffinate flow 7a are provided at two further connection ports between the separating zones 10, 11, 12 and 13.

In each of the separating zones 10, 11, 12 and 13, a countercurrent relationship exists between the solid and fluid phase. Given suitable adjustment of the flow relationships between the solid and the liquid phase, components A which interact more intensely with the solid are passed out with the extract flow 6a via the outlet 9a. Less intensely interacting components B are passed out by means of the raffinate flow 7a via the outlet 9c.

For the most part, the separation of the components A and B takes place in the separating zones 11 and 12, whereas the separating zones 10 and 13 serve the purpose of regeneration of the solid, which, for example, can be an adsorbent material, and of the solvent. The interconnected separating zones 10-13 form a clockwise circuit 8a and an anticlockwise circuit 8b.

Figure 4:
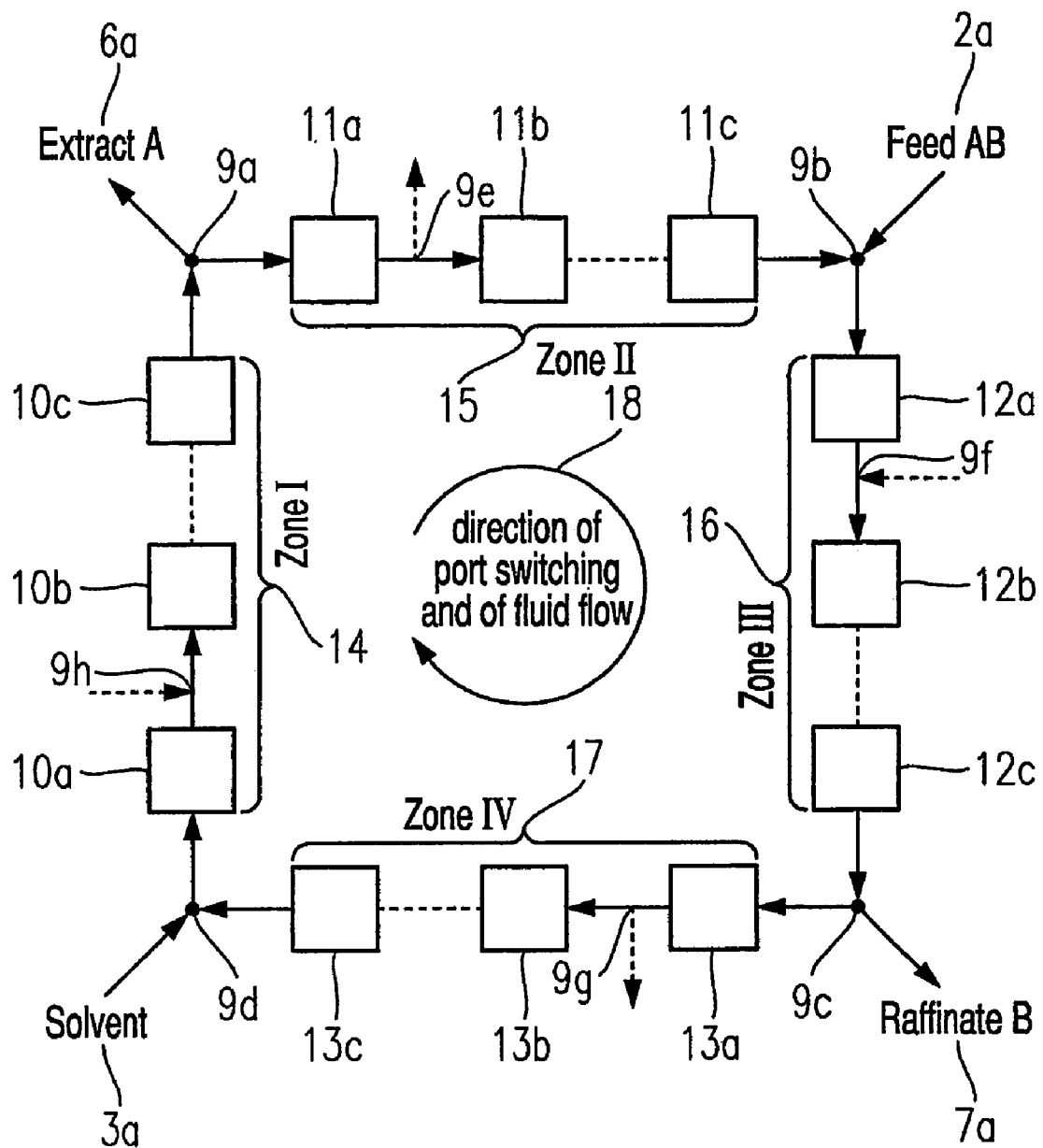
FIG. 4 shows a schematic representation of an apparatus suitable for performing the process claimed in the invention, in accordance with an embodiment the invention.

Due to technical problems which arise with the movement of the solid within the separating zones of a system which uses the TMB process, a system for performing an SMB process (Simulated Moving Bed process), as shown in FIG. 4, is used. In such an apparatus (system), a plurality of chromatographic separating columns 10a-10c, 11a-11c, 12a-12c, 13a-13c with stationary solid are connected together to form a ring. The separating columns 10a-10c form a first separating zone 14, the separating columns 11a-11c form a second separating zone 15, the separating columns 12a-12c form a third separating zone 16, and the separating columns 13a-13c form a fourth separating zone 17.

A movement of the solid is simulated through cyclical switching over of the inlets 9a, 9c and outlets 9b, 9d involving a shift, by one separating column, in the direction of a fluid flow forming a circuit 18. The time between two successive switching operations is referred to as a cycle unit. The SMB process can be understood as a practical realisation of the TMB process. Accordingly, the TMB process can be understood as a simplified model of the SMB process.

As a result of the switching operations, a cyclically stationary condition is achieved in the SMB process, rather than a purely stationary condition. The product concentrations and inner conditions are cyclical.

Conventionally, constant operating parameters, such as the volume flows of the input and output flows, the switching intervals and concentrations of the feed flows are used in the SMB process. Contrary to previous research in the area of the SMB process, the inventors have found that an increase in the efficiency of the system using an SMB process can be achieved by changing the concentration of the multiple-component fluid mixture (feed concentration) within a cycle unit.

Figure 5:
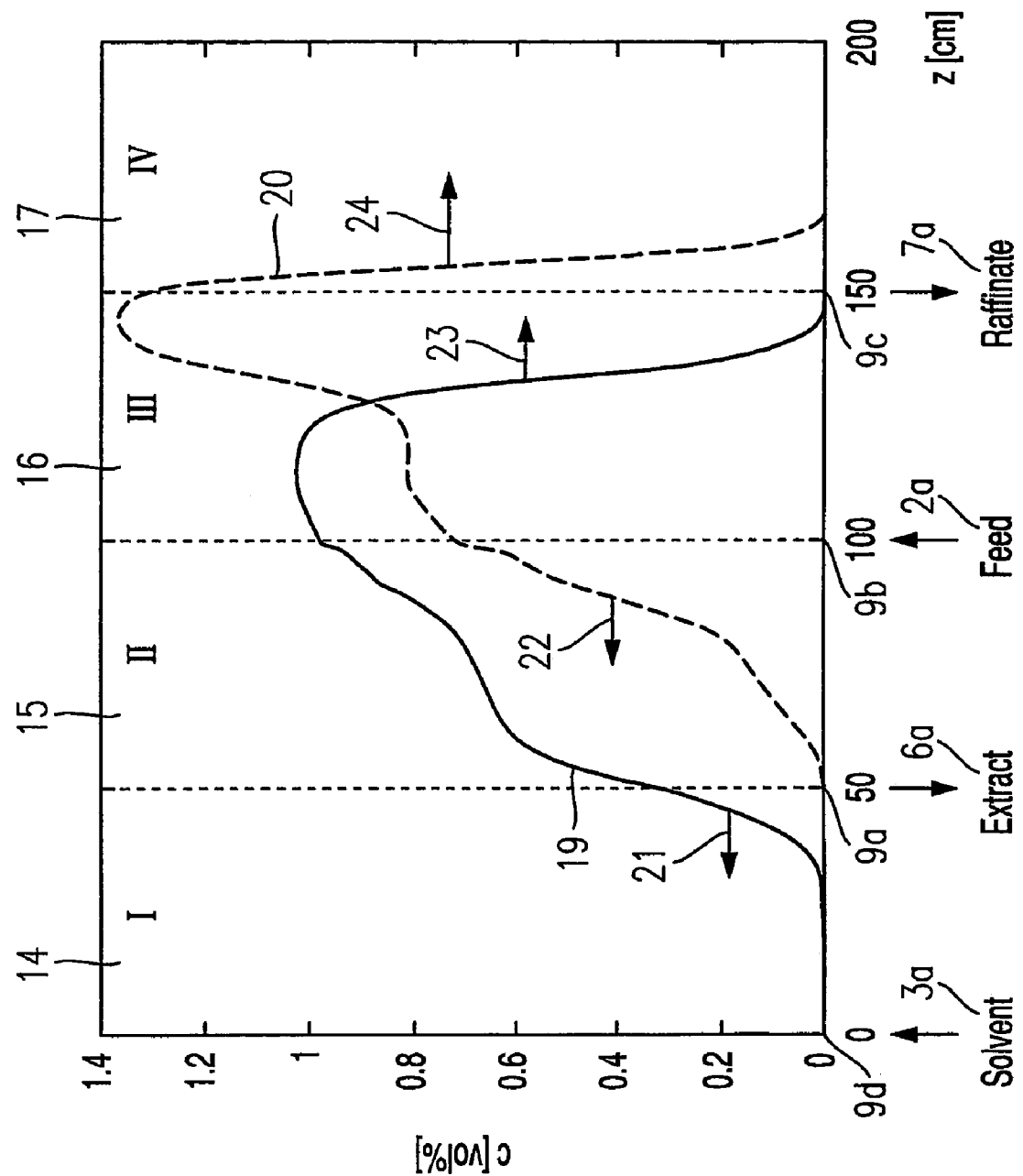
FIG. 5 is a diagram showing concentration profiles of the components within a system using the SMB process, as achieved using a conventional SMB process.

Concentration profiles for the concentrations of the components which are to be separated within the system using the SMB process with constant operating parameters are shown in FIG. 5. The components which are to be separated can, for example, be two cycloketones, which can be present in the multiple-component fluid mixture 2a in a high concentration or even in undissolved form and which are diluted to a certain concentration or dissolved before using the SMB process. The components may, for example, be present in equal concentrations.

The concentration profiles 19, 20, shown in FIG. 5 are viewed in relation to the middle of a switching cycle unit within the overall system, which in this case, for example, has a length of 200 cm. The system is operated with constant operating parameters, i.e. with a constant volume flow and synchronous switching cycle times.

A maximum fluid flow within the circuit 18 of the system is, for example, 60 ml/min in the area of the separating zone 14, taking into consideration the maximum permitted pressure loss.

The minimum volume flow of the input multiple-component fluid mixture is in this case 5 ml/min. Lesser volume flows cannot be adjusted due to the accuracy of the pump delivering the multiple-component fluid mixture.

Integrally-determined component purities within the extract and raffinate flows should be 98% in this case.

Safety factors of 10% are applied to the fluid flows within the separating zones 14 and 17 in order to ensure the complete regeneration of the solid and the solvent.

Based on the above data, simulation calculations for the conventional process produce a constant concentration of the multiple-component fluid mixture of maximum 1.25 vol % for both components which are to be separated. At a concentration of the multiple-component fluid mixture exceeding the value 1.25 vol %, product purities of 98% can no longer be achieved taking into account the minimum inflow rate of the multiple-component fluid mixture.

The so-called equilibrium dispersion model was used to simulate the system:

$$\frac{\partial c_i}{\partial t} + \frac{1-\varepsilon}{\varepsilon} \cdot \frac{\partial q_i(c_j)}{\partial t} + u \cdot \frac{\partial c_i}{\partial z} = D_{ap} \cdot \frac{\partial^2 c_i}{\partial z^2}$$

whereby c and q represent the concentrations in the fluid and solid phase. $D_{ap}$ is the dispersion coefficient, in which all peak-spreading effects are taken into account. $\varepsilon$ is the porosity of the separating column, and u is the linear speed of the solvent. The concentrations c and q are coupled by the adsorption isotherm. In this cases this is a multi-Langmuir isotherm:

$$q_i(c_j) = \frac{H_i \cdot c_i}{1 + \sum_j b_j \cdot c_j}.$$

This determines the dispersion behaviour of the components within the system.

As can be seen from the concentration profiles 19 and 20 shown in FIG. 5, the component concentrations move through the system as migrating fronts. Each of these fronts displays a constant migration rate within a separating zone 14-17. The fronts moving within the zones 16 and 17 are so-called shockwaves, according to the Langmuir behaviour, and the fronts moving within the zones 14 and 15 are called expansive waves. If other isotherms are present, the arrangement of the shockwaves and the expansive waves can vary accordingly.

The migration of the fronts is indicated by the arrows 21, 22, 23 and 24.

Figure 6:
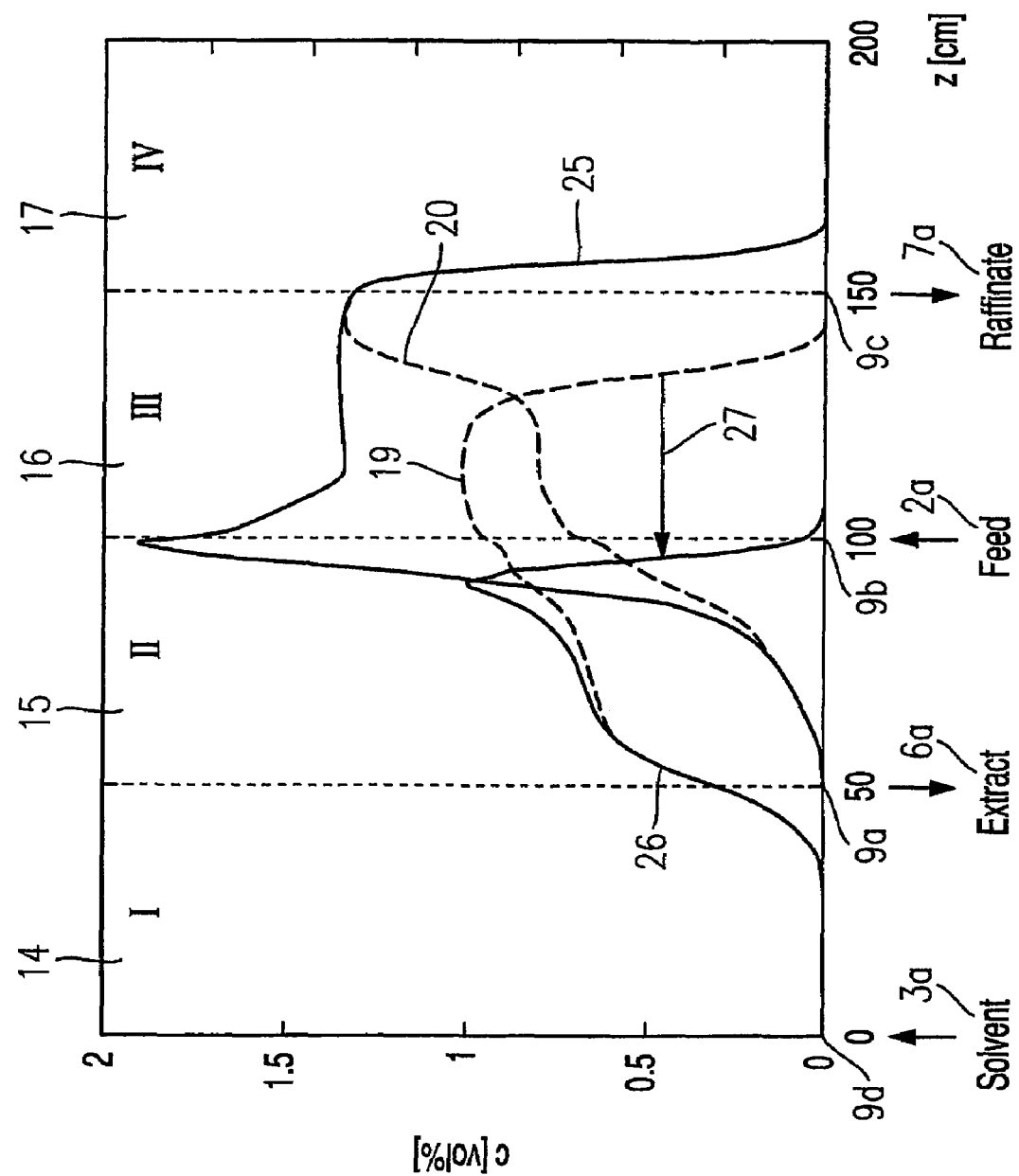
FIG. 6 shows the concentration profiles of the components within the system using the SMB process, as achieved using the process in accordance with the invention.

FIG. 6 shows concentration profiles for the components within a system using the SMB process in accordance with an embodiment of the invention. In this case, the concentration of the input multiple-component fluid mixture is not kept constant, but changes within a cycle unit (feed concentration gradient).

A cycle unit can, for example, be divided into four cycle sections of equal length. Pure solvent 3a is, for example, introduced in the first three cycle sections of the cycle unit, whereas a quadruple concentration of the multiple-component fluid mixture is introduced in the fourth cycle section of the cycle unit, in contrast to the conventional SMB process using a constant concentration.

The concentration profiles 25 and 26 shown with solid lines in FIG. 6 show the concentration of the components within the system in the middle of the duration of a cycle unit. The concentration profiles 19 and 20, indicated by broken lines, show the concentrations of the components in the conventional SMB process, in which constant feed concentrations are used. In both cases, the same constant volume flows are used for the input, output and internal flows.

In the invented process for chromatographic separation, the concentration profile 26 of the component A is shifted to the left, as indicated by the arrow 27. The component A counts as an impurity component of the raffinate products and by being shifted to the left results in a higher purity of the raffinate flow.

The reason for the shifting of the wave fronts can be explained by the formation of different wave forms.

A further optimisation of the invented process for separating the components can be achieved by shifting the fronts back with a variation of the composition of the feed. The "impurity front" of the raffinate flow is hereby shifted to the right again through an increase in the volume flow of the feed, as can be seen from the concentration profiles of the components within the system in accordance with an embodiment of the invented process shown in FIG. 7. The required purity of the raffinate flow of 98% is achieved by increasing the volume flow of the feed. The shifting to the right of the concentration profile 29 can be recognised through a comparison of the concentration profiles 26 and 29 reproduced in FIGS. 6 and 7.

Figure 7:
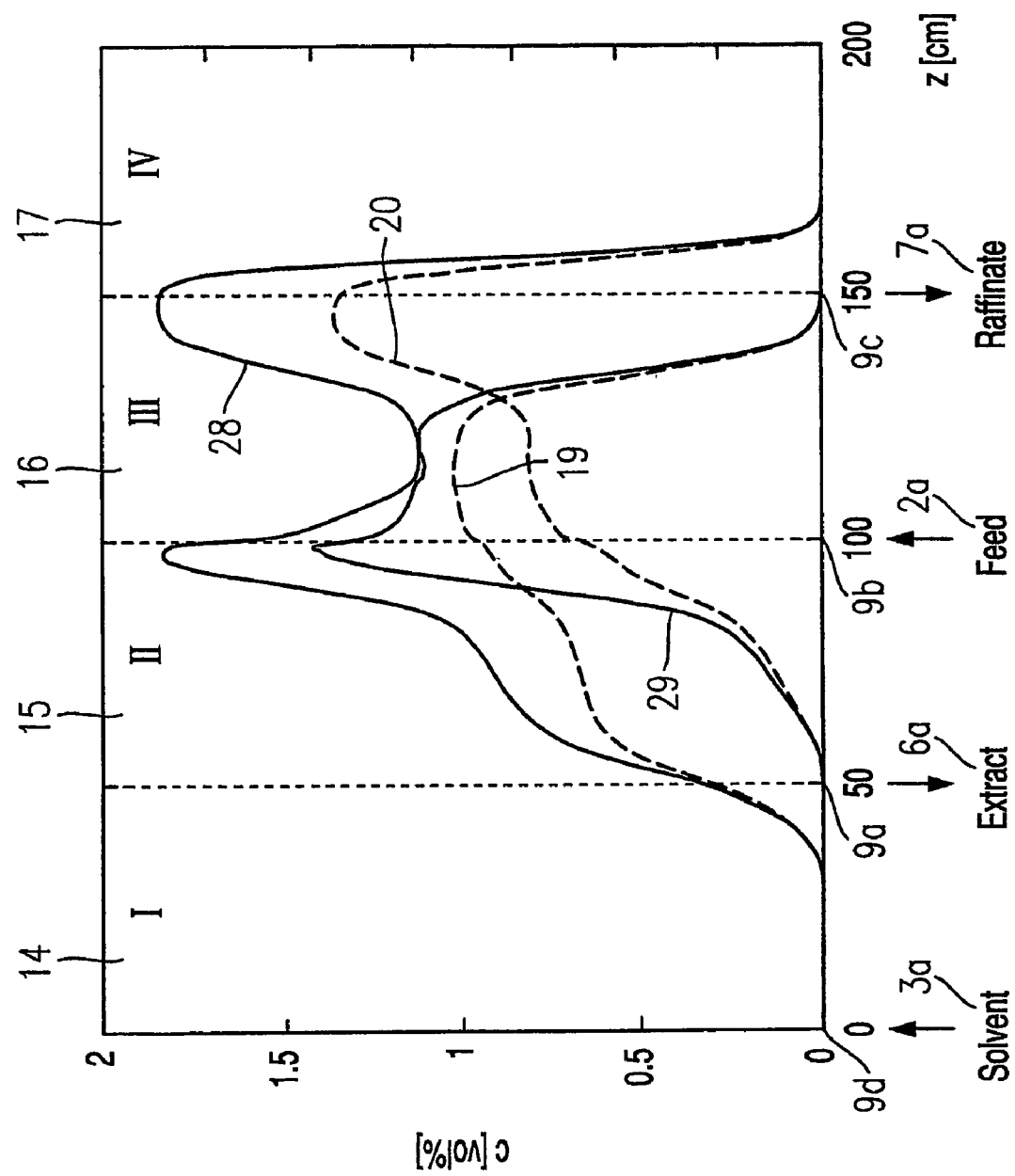
FIG. 7 shows the concentration profiles of the components within the system using the SMB process, as achieved using an embodiment of the process in accordance with the invention.

The invented process can also be optimised on the basis of a minimum feed volume flow of 5 ml/min in that the concentration of the feed is increased in the last quarter of a cycle unit. Resulting concentration profiles 28 and 29 are represented in FIG. 7 with solid lines. In contrast, the concentration profiles 19 and 20, as result where a conventional SMB process is used, are represented by broken lines.

The following Table 1 shows the parameters used in the simulation study for a process for the chromatographic separation of components in accordance with the SMB process for a conventional mode of operation with constant operating parameters, for the use of a feed concentration gradient with identical volume flows, which are also used with the conventional process, and for the use of a feed concentration gradient with optimised operating parameters in terms of the volume flows and concentrations of the feed volume flows.

|  | konventionelle Auslegung | a) Feedkonzentrations-gradient, gleiche Ströme | b) Feedkonzentrations-gradient, optimiert |
|---|---|---|---|
| Säulenanzahl |  | 8 |  |
| Säulenanordnung |  | 2/2/2/2 |  |
| totale Porosität der Säulen $\epsilon$ |  | 0.83 |  |
| Säulenlänge |  | 25 cm |  |
| Dispersionskoeffizient (u = Fluidgeschwindigkeit) |  | $D_{ap}$ [cm$^2$/min] = 0.25 · u |  |
| Langmuir-Parameter |  | $H_1 = 8.52$; $b_1 = 0.295$ vol %$^{-1}$ $H_2 = 5.97$; $b_2 = 0.154$ vol %$^{-1}$ |  |
| Taktzeit |  | 3.17 min |  |
| Volumenstrom in Zone I |  | 60 ml/min |  |
| Extraktstrom [ml/min] |  | 19.14 | 20.50 |
| Raffinatstrom [ml/min] |  | 5.93 | 5.60 |
| Feedstrom [ml/min] |  | 5.01 | 5.01 |
| Eluentstrom [ml/min] |  | 20.06 | 21.09 |
| Feedkonzentrations [vol %] | 1.25 = const. | 0/0/0/5 | 0/0/0/6.6 |

It can be seen from Table 1 that the duration of a cycle unit is 3.17 minutes and the volume flow of the fluid flow within zone I (separating zone 14) is 60 ml/min.

An improved process for the chromatographic separation of components using a feed concentration gradient (feed concentration gradient, optimised) is obtained through optimal adjustment of the volume flows of the extract flow, the raffinate flow, the feed flow and the eluent flow and by increasing the concentration of the feed in the fourth cycle section to 6.6 vol %.

Table 2 below shows performance characteristics for the conventional process with optimised volume flows, the use of a feed concentration gradient with volume flows which are identical with those used in the conventional mode of operation, and for the use of an optimised feed concentration gradient with optimised constant volume flows.

Table 2 shows, for comparison, the average product concentration $\bar{c}_i^{-k}$, a product quantity flow $\dot{m}_i^k$, a product purity $PUR_i^k$, a productivity $PR_i^k$ and a specific solvent consumption $EC_i^k$.

The indices i and k relate to the components A within the extract flow and B within the raffinate flow (i=component, k=Ex, Ra).

As a result of the higher feed throughput with a feed concentration of 6.6 vol % in the last cycle section of each cycle unit as opposed to a constant feed concentration of 1.25 vol %, an increase in productivity, defined as the mass of the purified mixture per time unit and adsorbent volume, of 33% is achieved with the optimised process, in comparison with the conventional process. Furthermore, a reduction in the specific solvent consumption, i.e. the quantity of solvent consumed per product quantity of a component produced, of 21%

|  |  | konventionelle Auslegung | a) Feedkonzentrations-gradient, gleiche Ströme | b) Feedkonzentrations-gradient, optimiert | Unterschied von b) zur konventionellen Auslegung |
|---|---|---|---|---|---|
| $\bar{c}_i^k$ | Ex | 0.32 | 0.33 | 0.40 | +25% |
| [vol %] | Ra | 1.04 | 1.04 | 1.45 | +39% |
| $\dot{m}_i^k$ | Ex | 0.061 | 0.063 | 0.081 | +33% |
| [ml/min] | Ra | 0.061 | 0.063 | 0.081 |  |
| $PUR_i^k$ | Ex | 98.0 | 98.1 | 98.0 |  |
| [%] | Ra | 98.0 | 100.0 | 98.0 |  |
| $PR_i^k$ | Ex | 5.7 · 10$^{-4}$ | 5.9 · 10$^{-4}$ | 7.9 · 10$^{-4}$ | +33% |
| $\left[\dfrac{ml}{min \cdot cm^3}\right]$ | Ra | 5.7 · 10$^{-4}$ | 5.8 · 10$^{-4}$ | 7.9 · 10$^{-4}$ |  |
| $EC_i^k$ | Ex | 406 | 398 | 320 | −21% |
| [ml/ml] | Ra | 406 | 406 | 320 |  | is achieved. The product concentrations lie 25 and 39% above the concentrations obtained using the conventional process.

The invented process involves the deliberate exploitation of the non-linearity of the thermodynamic equilibrium. Its use is therefore not restricted to the example used here of the presence of the Langmuir adsorption isotherm. Rather, for every non-linear isotherm there exists a feed concentration profile which allows the optimisation of the process in comparison with the conventional mode of operation. For example, in order to optimise the process in the case of isotherms of the so-called anti-Langmuir type, the feed concentration should be increased at the beginning of the cycle unit and reduced towards the end of the cycle unit. Furthermore, the use of the invented process in other SMB process variants, such as those involving the use of gaseous or supercritical mobile phases, in the case of SMB separating processes with integrated chemical reaction or in SMB processes departing from the classic four-zone configuration (e.g. systems for the separation of more than 2 components), is possible.

In addition, the invented process can also be used generally for other multiple-phase separating processes with a cyclical character and non-linear phase equilibrium.

LIST OF REFERENCE NUMBERS 1 separating column
2, 2a multiple-component fluid mixture
3, 3a solvent
4 container
5 concentration profile
6, 6a extract flow
7, 7a raffinate flow
8a, 8b, 18 circuits
9a, 9b, 9c, 9d inlets and outlets
10, 11, 12, 13 separating zones
10a, 10b, 10c;
11a, 11b, 11c;
12a, 12b, 12c;
13a, 13b, 13c chambers, separating columns
14, 15, 16, 17 separating zones
19, 20, 25, 26, 28, 29 concentration profiles
21, 22, 23, 24 direction of the migrating waves
27 direction of shift

The invention claimed is:

1. A process for the chromatographic separation of components of a multiple-component fluid mixture by means of a Simulated Moving Bed Process, comprising passing the multiple-component fluid mixture and at least one solvent into a plurality of at least one chamber or chamber sections containing a solid, at a first and second input, and an extract flow, which contains at least one first component separated from the multiple-component fluid mixture, as well as a raffinate flow, which contains at least one second component separated from the multiple-component fluid mixture are drawn off from the chambers or chamber sections at a first and second outlet, whereby the chambers or chamber sections forming a closed circuit are connected together in series, and connection ports of the first and second inlets and outlets arranged between two chambers or chamber sections of the circuit are repositioned between two other chambers or chamber sections of the circuit at the end of a cyclical time unit, wherein the concentration of the input multiple-component fluid mixture and/or a composition of the solvent is/are changed within the cyclical time unit, which represents the duration between two switching operations for repositioning connection ports.

2. The process according to claim 1, wherein a pressure of the input multiple-component fluid mixture and/or of the solvent is changed, in steps and/or continuously, within a cyclical time unit.

3. The process according to claim 1, wherein a temperature of the input multiple-component fluid mixture and/or of the solvent is changed, in steps and/or continuously, within a cyclical time unit.

4. The process according to claim 1, wherein the concentration of the multiple-component fluid mixture and/or the composition of the solvent is changed, in steps and/or continuously.

5. The process according to claim 1, wherein at least one solid is used which is suitable for bringing about differing migration rates of the individual components of the multiple-component fluid mixture in the individual chambers or chamber sections.

6. The process according to claim 1, wherein the solid is an adsorbent material.

7. The process according to claim 1, wherein a mixture of a plurality of fluids is used as solvent.

8. The process according to claim 1, wherein a gas or a mixture of a plurality of gases which is/are in a supercritical or subcritical state is used as solvent and/or multiple-component fluid.

9. The process according to claim 1, wherein the solvent comprises components which are to be separated.

10. The process according to claim 9, wherein the solvent comprising the components which are to be separated and the solvent without the components which are to be separated display different compositions and/or capacities in terms of influencing the bonding behaviour of the components which are to be separated in relation to the solid.

11. The process according to claim 1, wherein a chemical reaction is carried out in the chambers or chamber sections in order to produce and separate the components.

12. The process according to claim 1, wherein the connection ports of the first and second inlets and outlets are repositioned at different times.

13. The process according to claim 1, wherein at least one volume flow of the multiple-component fluid mixture, of the solvent, of the extract flow, of the raffinate flow and internal recirculation flows is changed, in steps and/or continuously, within a cyclical time unit.

14. The process according to claim 1, wherein the concentration of the input multiple-component fluid mixture and/or a composition of the solvent is/are changed within the cyclical time unit to enhance productivity, defined as the mass of the purified multiple component fluid mixture per unit time and the solid.

* * * * *